(12) United States Patent
Vadapandeshwara et al.

(10) Patent No.: US 10,152,318 B2
(45) Date of Patent: Dec. 11, 2018

(54) COMPUTER SYSTEM AND METHOD FOR EXECUTING APPLICATIONS WITH NEW DATA STRUCTURES

(71) Applicant: ORACLE FINANCIAL SERVICES SOFTWARE LIMITED, Mumbai (IN)

(72) Inventors: Rajaram N. Vadapandeshwara, Bangalore (IN); Seema M. Monteiro, Bangalore (IN); Jesna Jacob, Bangalore (IN); Tara Kant, Patna (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 0 days.

(21) Appl. No.: 15/420,332

(22) Filed: Jan. 31, 2017

(65) Prior Publication Data

US 2018/0217835 A1    Aug. 2, 2018

(51) Int. Cl.
*G06F 9/44*  (2018.01)
*G06F 8/656*  (2018.01)

(52) U.S. Cl.
CPC .................... *G06F 8/656* (2018.02)

(58) Field of Classification Search
CPC ....................................................... G06F 8/656
USPC .................. 717/168–178; 709/203
See application file for complete search history.

(56) References Cited

U.S. PATENT DOCUMENTS

| | | | | |
|---|---|---|---|---|
| 6,256,723 B1 * | 7/2001 | Hudson | ............... | G06F 12/0284 711/129 |
| 6,715,144 B2 * | 3/2004 | Daynes | ..................... | G06F 8/61 717/168 |
| 7,080,371 B1 * | 7/2006 | Arnaiz | ..................... | G06F 8/65 717/168 |
| 7,089,546 B2 * | 8/2006 | Watanabe | ............. | G01C 21/32 701/450 |
| 7,814,142 B2 * | 10/2010 | Mamou | .................. | G06Q 10/10 709/203 |
| 7,921,419 B2 * | 4/2011 | Chatterjee | ............... | G06F 8/656 717/170 |

(Continued)

OTHER PUBLICATIONS

Lehnert,, "A Taxonomy for Software Change Impact Analysis", ACM, pp. 41-50, 2011.*

(Continued)

*Primary Examiner* — Anil Khatri
(74) *Attorney, Agent, or Firm* — Kraguljac Law Group, LLC

(57) ABSTRACT

Systems, methods, and other embodiments associated with introducing a new data structure to an executing application are described. In one embodiment, a method includes executing an application as an executing application to process data of a data structure maintained according to a data model. The example method may also include receiving a new data structure definition of a new data structure to define for the data model. The example method may also include performing impact analysis to determine whether the executing application is capable of processing data of the new data structure. The example method may also include updating the data model to include the new data structure definition to create an updated data model. The example method may also include generating control instructions to instruct the executing application to utilize data from the new data structure according to the updated data model.

20 Claims, 7 Drawing Sheets

(56) References Cited

U.S. PATENT DOCUMENTS

| | | | | |
|---|---|---|---|---|
| 8,024,369 B2* | 9/2011 | Pellegrini | G06F 9/5038 | 707/758 |
| 8,209,660 B2* | 6/2012 | Sundararajan | G06F 8/71 | 717/105 |
| 8,296,412 B2* | 10/2012 | Secor | G06Q 10/087 | 709/223 |
| 8,452,136 B2* | 5/2013 | Nishio | H05K 1/0274 | 385/14 |
| 8,549,064 B2* | 10/2013 | Kamalakantha | G06F 17/30557 | 709/203 |
| 9,009,695 B2* | 4/2015 | Unfried | G10L 15/065 | 717/168 |
| 9,026,652 B1* | 5/2015 | Piehler | H04L 67/02 | 709/203 |
| 9,026,996 B2* | 5/2015 | Ramachandran | G06F 17/30581 | 709/221 |
| 9,804,834 B1* | 10/2017 | Lopyrev | H04L 67/1097 | |

OTHER PUBLICATIONS

Canfora et al, "Fine Grained Indexing of Software Repositories to Support Impact Analysis", ACM, pp. 105-111, 2006.*
Bramandia et al, "Optimizing updates of recursive XML views of relations", The VLDB Journal, pp. 1313-1333, 2009.*
Kit et al, "Enumerating XML Data for Dynamic Updating", ACM, pp. 75-84, 2005.*
Vidal et al, "Preserving Update Semantics in Schema Integration", ACM, pp. 263-271, 1994.*
Sriplakich et al, "Supporting Transparent Model Update in Distributed CASE Tool Integration", ACM, pp. 1759-1766, 2006.*

* cited by examiner

COMPUTER SYSTEM AND METHOD FOR EXECUTING APPLICATIONS WITH NEW DATA STRUCTURES

BACKGROUND

An application development cycle entails developing an application using programming code that is input through an integrated development environment or some other application development environment. The programming code is compiled into an executable that can be executed to run the application. The application can be tested, and subsequently modified through the integrated development environment by modifying the programming code. The modified programming code is recompiled into a new executable. The application can be deployed to various computing devices and computing environments for execution. The application development cycle can be cumbersome and time consuming because the application cannot be tested and modified in real-time during execution of the application. Instead, the programming code must be modified and recompiled into the new executable offline from execution of the application.

If the application is to be updated, then a software update patch is created, such as through the integrated development environment. An executing instance of the application on a computing device must be terminated. After execution of the application is terminated, the software update patch is executed and applied to data of the application such as to an executable of the application. Once the application is updated, the executable can be re-executed as a new executing instance of the updated application. Updating the application is disruptive to the user, can cause errors for other applications relying upon non-disrupted execution of the application, and results in downtime of the application. For example, if a network connectivity application is taken offline in order to be updated, then applications relying upon the network connectivity application for network connectivity will experience network connectivity interruptions, errors, and/or downtime.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that provide for introducing a new data structure to an executing application. The executing application is reconfigured to operate with the new data structure, such to extract and process data from a new data table with one or more columns and/or rows. The new data structure is introduced to the executing application during execution of the executing application to cause the executing application to process data from the new data structure. The reconfiguration of the executing application is done without stopping execution of the executing application, without recompiling the executing application, and/or without reprogramming/recoding the executing application. In this way, the executing application is efficiently reconfigured without disrupting execution of the executing application that otherwise can cause client downtime, data loss, and/or errors for other applications that rely on uninterrupted execution of the executing application.

A new data structure definition of the new data structure is applied to a data model used by the executing application to access and/or process data from data structures. The data model is a representation of a set of data elements, within data structures, that are used by applications. The data model is updated to include the new data structure definition. In this way, an updated data model is created, such as on-the-fly while still accessible to executing applications. The updated data model is used by the executing application to access and/or process data from the new data structure. The data model can be updated without taking the data model offline and/or while the executing application is executing, which reduces disruption to applications that rely upon continued availability of the data model.

Figure 1:
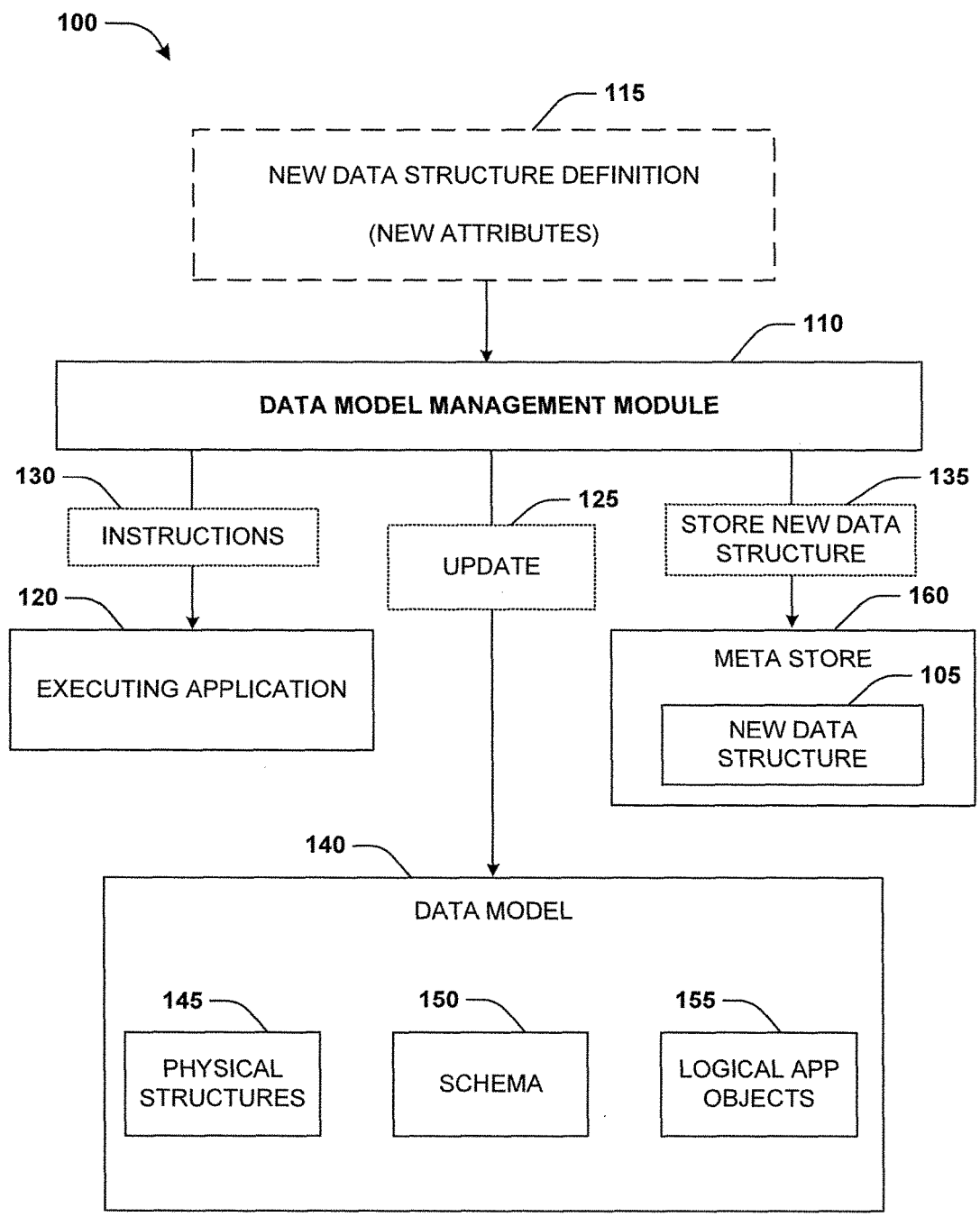
FIG. 1 illustrates an embodiment of a system associated with introducing a new data structure to an executing application.

With reference to FIG. 1, one embodiment of a computer system 100 associated with introducing a new data structure to an executing application is illustrated. The system 100 includes a data model management module 110, which can be configured to execute on a computer, such as computer 715 of FIG. 7, or within any other computing environment such as a distributed cloud computing environment hosting applications and data models used by those applications. An application is executed as an executing application 120 that processes data of attributes stored within a data structure maintained according to a data model 140. For example, a financial services application may be executed to analyze banking data within a banking database. The banking database may comprise a data structure such as a bank account table. The bank account table may comprise columns of attributes such as a first column with a customer ID attribute, a second column with an account number attribute, a third column with an account balance attribute, etc. The bank account table may comprise rows populated with data having such attributes. During execution, the financial services application can retrieve and process data from the bank account table.

The data model 140 is a representation of a set of data elements that are used by applications for normal operation.

A data element may correspond to an attribute, such as a customer identifier data element that corresponds to the customer ID attribute of the first column within the bank account table. Thus, the financial services application can expect that customer identifier data elements will be populated within the first column based upon the data model 140. The data elements are represented through a schema 150, such as a database schema, corresponding to physical structures 145 and/or logical application objects 155. The logical application objects correspond to logical structures understood by applications. In an example of the logical application objects 155, a physical column name of a data structure may be labeled with a cryptic code that the financial services application does not natively understand. Thus, a logical structure may be provided for the physical column name so that the application can interpret and understand the physical column name.

A bank may want to add a new data structure 105 for use by the executing application 120. The new data structure 105 may correspond to a consumerism table comprising a first column with a historic interest rate attribute, a second column with a consumer spending attribute, and/or other columns with other attributes. Accordingly, the executing application 120 is reconfigured to operate with the new data structure 105, such as without terminating execution of the executing application 120, without recoding/reprogramming the executing application 120, and/or without recompiling or applying a software update patch to the executing application 120. The new data structure 105 is stored 135 for access by executing applications, such as stored within a meta store 160.

A new data structure definition 115, used to define the new data structure 105 to the data model 140, is received by the data model management module 110. In an embodiment where the new data structure 105 corresponds to the consumerism table, the new data structure definition 115 comprises a definition of the consumerism table. The definition describes the first column having the historic interest rate attribute, the second column having the consumer spending attribute, and/or other columns with other attributes of the consumerism table. The definition describes data types of the columns of the consumerism table.

In an embodiment, the new data structure definition 115 is setup through an assignment interface. The assignment interface is populated with a set of attributes of the new data structure 105, such as the historic interest rate attribute and the consumer spending attribute. The assignment interface is populated with a set of functionality provided by the executing application 120, such as a future interest rate prediction function, a consumer spending prediction function, a create bank statement function, etc. An assignment of one or more attributes to a function is received through the assignment interface. For example, a user may assign the historic interest rate attribute to the future interest rate prediction function. The assignment is tested by inputting data of the historic interest rate attribute from the new data structure 105, such as from the first column, into the executing application. A testing result, showing how output of the executing application 120 changes based upon consumption of the data having the historic interest rate, is obtained. The testing result is displayed through the assignment interface. For example, the testing result may indicate that the future interest rate prediction function provided a relatively more detailed and/or precise prediction of interest rates based upon using the data, of the new data structure 105, having the historic interest rate attribute.

The data model management module 110 performs impact analysis to determine whether the executing application 120 is capable of processing data of the new data structure 105. In an embodiment, a test of the new data structure 105 is performed by inputting data from the new data structure 105 into the executing application 120. The data is input as an additional set of conditions that can be used by the executing application 120. In this way, an impact analysis report is generated based upon how the executing application 120 utilizes the additional set of conditions or whether the executing application 120 is unable to utilize the additional set of conditions. The impact analysis report may specify that the data caused a change in operation of the executing application 120, such as a slowdown of the executing application 120, a crash of the executing application 120, etc. The impact analysis report may specify that the data caused the executing application 120 to output information that is less detailed, more detailed, or having the same level of detail as what was output by the executing application 120 before the test.

In this way, the impact analysis report can specify how information (e.g., a financial report), output by the executing application 120, changes based upon access to the new data structure 105. The impact analysis report can specify what new information is output by the executing application based upon access to the new data structure 105 (e.g., a new type of statistic can now be provided). The impact analysis report can specify how operation of the executing application 120 changes.

In an embodiment, the impact analysis report is generated to specify that the executing application 120 can use data from the new data structure 105 as a filter for filtering data processed by the executing application 120. For example, client zip code information from the new data structure 105 may be used by the executing application 120 to filter interest rate data.

In another embodiment, the impact analysis report is generated to specify that the executing application 120 can use data from the new data structure 105 as a variable for an analysis function that is executed by the executing application 120. For example, historic yearly consumer spending data from the new data structure 105 may be used as a variable by the executing application when executing a prediction function to predict consumer holiday spending.

In another embodiment, the impact analysis report is generated to specify that the executing application 120 can use data from the new data structure 105 as a parameter for analyzing data. For example, customer overdraft fee data from the new data structure 105 can be used by the executing application 120 as a parameter for analyzing bank account fees of customers.

In another embodiment, the impact analysis report is generated to specify that the executing application 120 can use data from the new data structure 105 to generate a report. For example, daily withdrawal data from the new data structure 105 may be used by the executing application 120 to generate a bank account utilization report.

The data model management module 110 may determine that the executing application 120 is not capable of processing the data of the new data structure 105. For example, the executing application 120 may return an error, may crash, may return the same output as if the data from the new data structure 105 was not used as an input, etc. Accordingly, the data model management module 110 provides a notification through the assignment interface that the new data structure 105 cannot be utilized by the executing application 120. In an embodiment, the data model management module 110 can also turn off an execution path, of the executing application 1202, which is directed to the new data structure 105.

In response to determining that the executing application 120 is capable of processing the data of the new data structure 105, the data model management module 110 updates 125 the data model 140 to include the new data structure definition 115 to create an updated data model. Before the update 125, the new data structure definition 115 may be formatted into a format understood and used by the data model 140, such as into information that can be used to update the physical structures 145, the schema 150, and/or the logical application objects 155 of the data model 140. The data model 140 can be updated 125 on-the-fly during real-time operation of the data model 140, such as while executing applications are using the data model 140. For example, the data model 140 is updated 125 during execution of the executing application 120 that relies upon the data model 140.

The data model management module 110 generates control instructions 130 to instruct the executing application 120 to utilize data from the new data structure 105 according to the update data model. For example, an execution path of the executing application 120 is modified so that the executing application 120 utilizes the new data structure 105 as input. The executing application 120 is reconfigured to operate with the new data structure 105 without stopping execution of the executing application 120, without recompiling the executing application 120, and/or without reprogramming/recoding the executing application 120. For example, the executing application 120 is dynamically instructed to utilize data from the new data structure 105 without interrupting execution of the executing application 120. Thus, the executing application 120 is instructed on-the-fly during real-time execution of the executing application 120 to utilize data from the new data structure 105 as input. In this way, the new data structure 105 is introduced to the executing application 120 during execution of the executing application 120 to cause the executing application 120 to process data from the new data structure 105.

Figure 2:
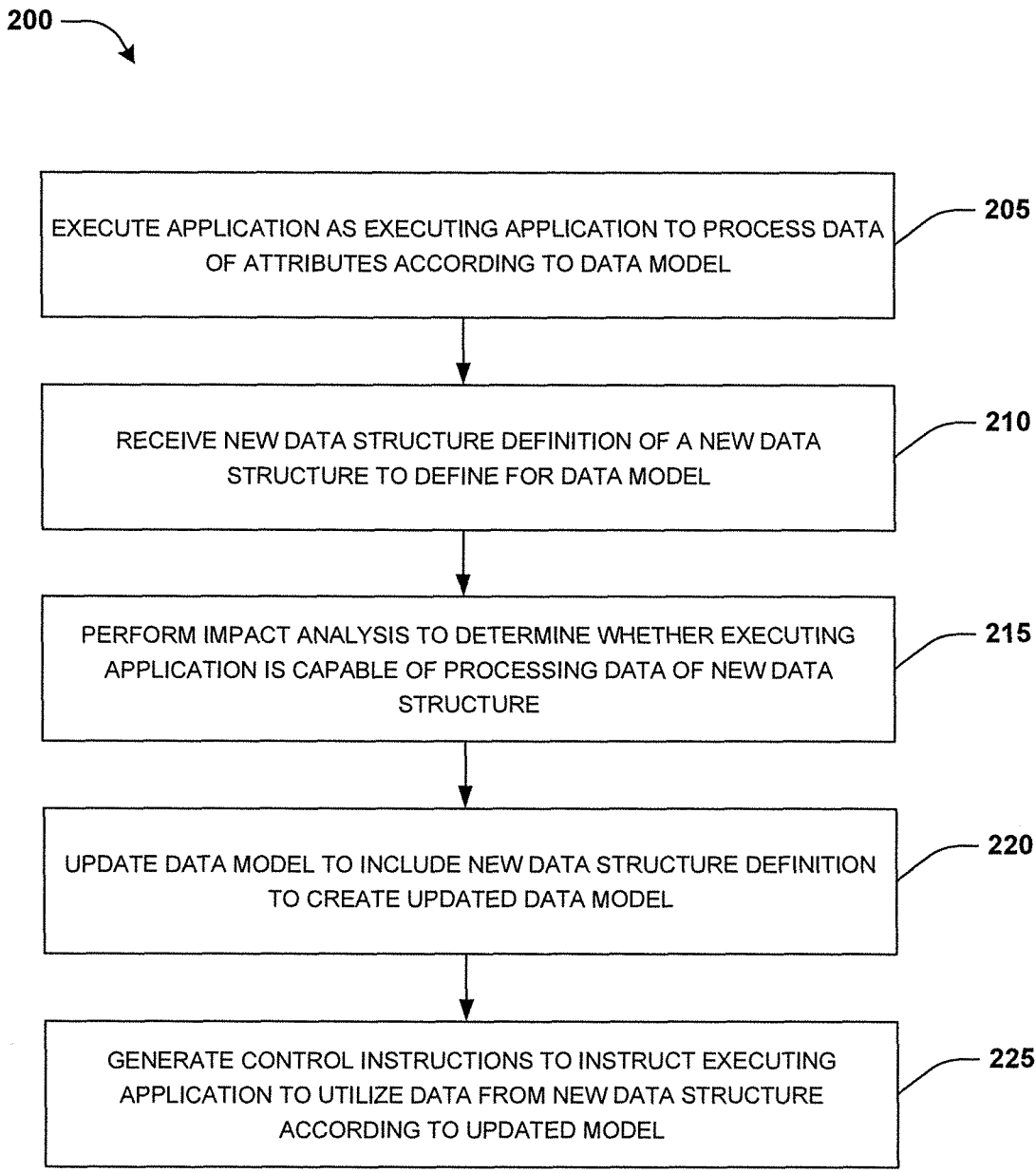
FIG. 2 illustrates an embodiment of a method associated with introducing a new data structure to an executing application.

With reference to FIG. 2, one embodiment of a computer implemented method 200 associated with introducing a new data structure to an executing application is illustrated. In one embodiment, the method 200 is performed by the data model management module 110 utilizing various computing resources of the computer 715, such as the processor 720 for executing instructions associated with performing impact analysis, updating a data model, and/or generating control instructions to update an executing application. Memory 735 and/or disks 755 are used for storing a new data structure, a new data structure definition, control instructions, and/or other data. Network hardware is used for communicating data between the computer 715 and remote computers over a network. The method 200 is triggered upon a user defining a new data structure definition of a new data structure.

At 205, an application is executed as an executing application 120 to process data of attributes stored within a data structure maintained according to a data model 140. For example, a bank lending risk application may utilize data within a database to predict a risk of establishing a particular loan with a certain customer.

Figure 3:
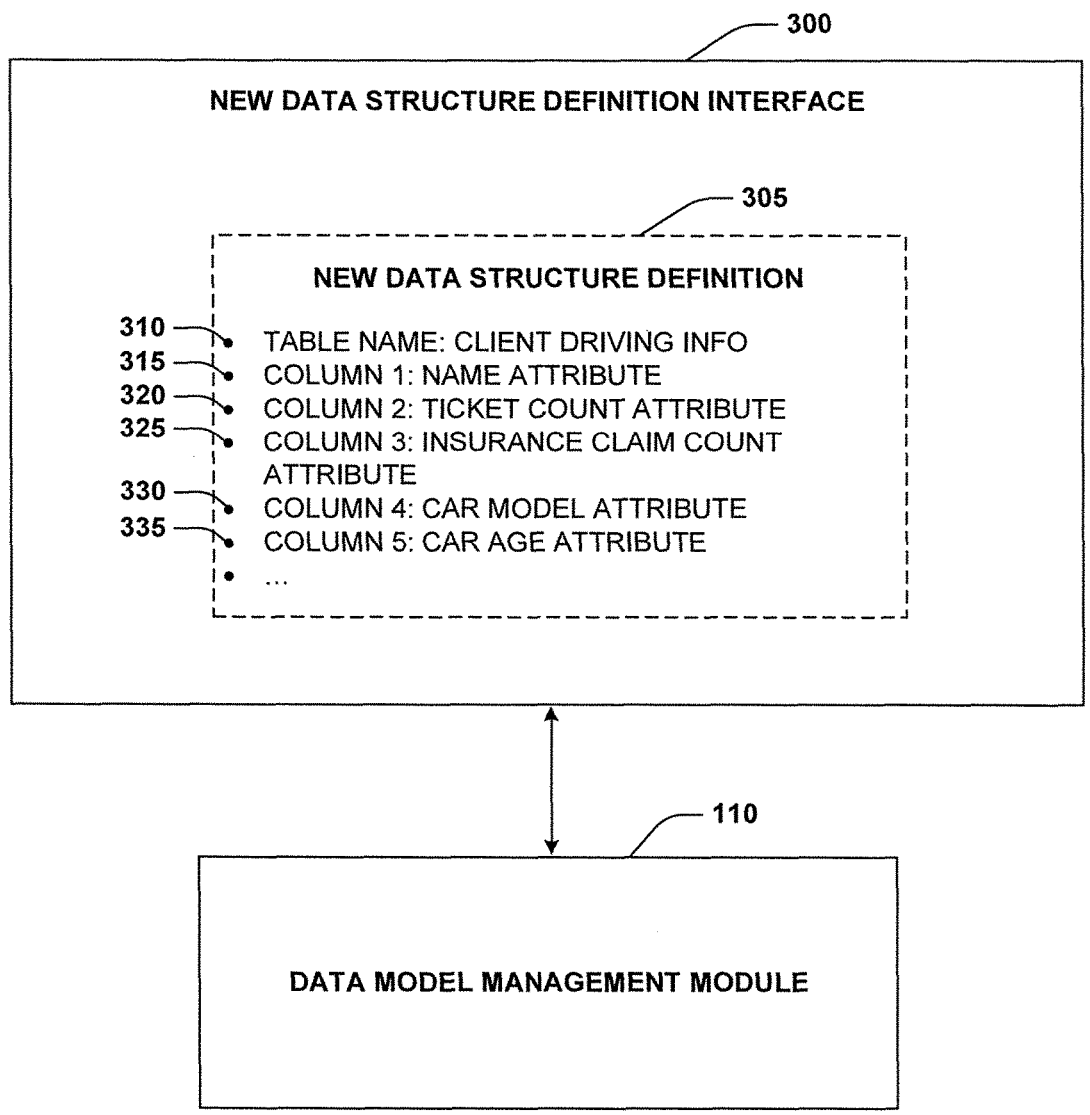
FIG. 3 illustrates an embodiment of a system associated with introducing a new data structure to an executing application, where a new data structure definition is received.

At 210, a new data structure definition 305, of a new data structure 415 such as a client driving info table to define for the data model 140, is received by the data model management module 110, as illustrated in FIG. 3. For example, a user may utilize a new data structure definition interface 300 to define the new data structure definition 305 describing the client driving info table. The new data structure definition 305 may describe a table name 310 client driving info, a first column 315 as having a name attribute, a second column 320 having a ticket count attribute, a third column 325 having an insurance claim count attribute, a fourth column 330 having a car model attribute, a fifth column 335 having a car age attribute, etc. The new data structure definition 305 may specify data types to expect for data within each column.

Figure 4:
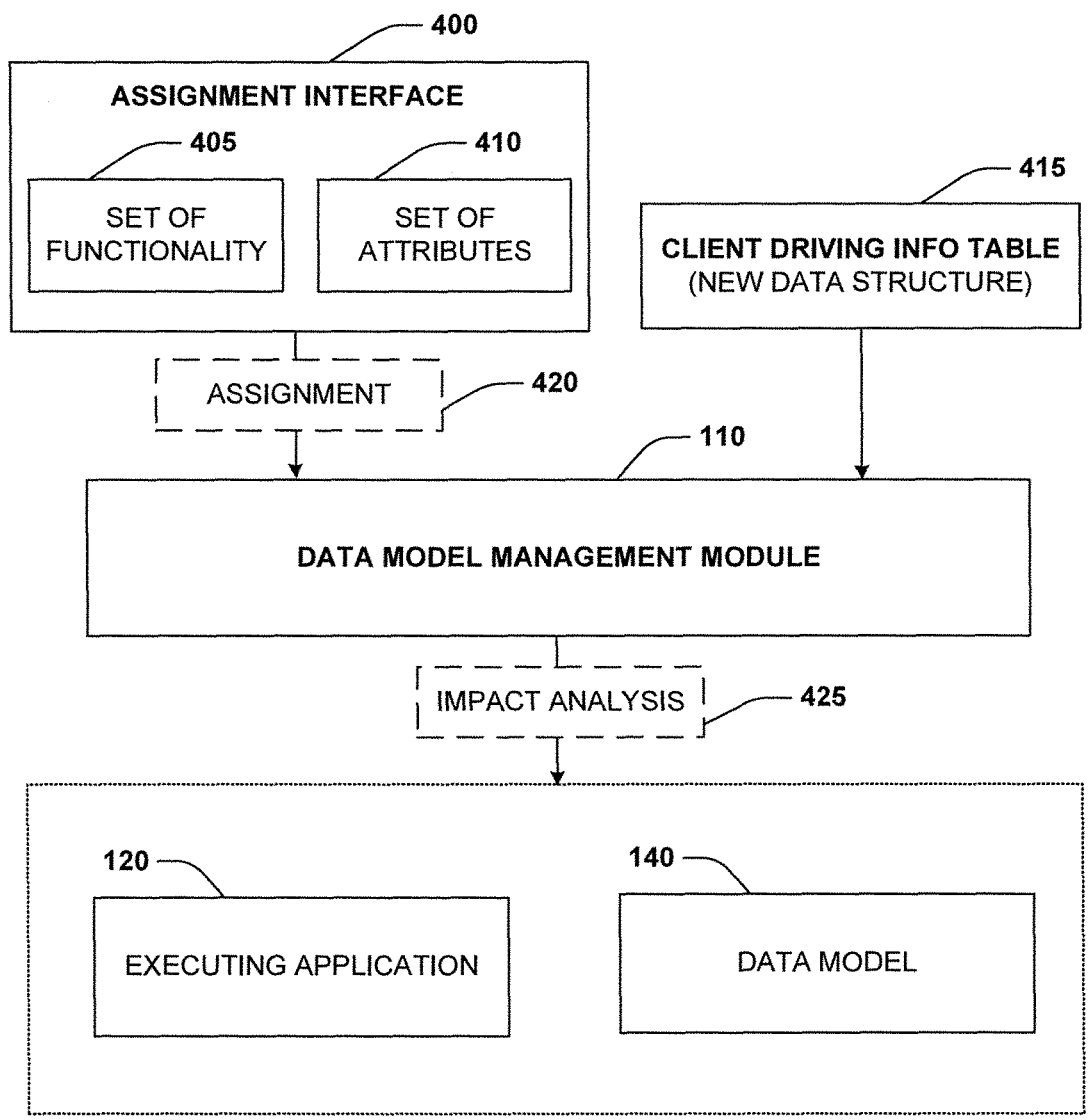
FIG. 4 illustrates an embodiment of a system associated with introducing a new data structure to an executing application, where impact analysis is performed.

At 215, impact analysis 425 is performed to determine whether the executing application 120 is capable of processing the data of the new data structure 415, as illustrated in FIG. 4. For example, an assignment interface 400 is provided to the user. The assignment interface 400 is populated with a set of attributes 410 of the new data structure 415, such as the name attribute, the ticket count attribute, the insurance claim count attribute, the car model attribute, the car age attribute, etc. The assignment interface 400 is populated with a set of functionality 405 of the executing application 120, such as lending risk prediction functionality, customer invoice creation functionality, banking statistics functionality, etc.

An assignment 420 of one or more attributes to a function of the executing application 120 is received through the assignment interface 400 by the data model management module 110. For example, the ticket count attribute, the insurance claim count attribute, the car model attribute, and the car age attribute may be assigned to the lending risk prediction functionality. In this way, the executing application 102 uses data, from the new data structure 415, having such attributes as input into the lending risk prediction functionality.

The data model management module 110 can test the assignment 420 using impact analysis 425 by inputting data of the assigned attributes into the executing application 120. The data model management module 110 obtains a testing result showing how output of the executing application 120 changes based upon consumption of the data, from the new data structure 415, having the assigned attributes. For example, the executing application 120 may output a detailed risk analysis that provides a more granular level of detail because the lending risk prediction functionality can now use the data, from the new data structure 415, having the assigned attributes. For example, the detailed risk analysis may factor in data that was previously considered, and now also factors in new types of data relating to ticket counts, insurance claim counts, car model information, and/or car age information, which improves the precision of the lending risk prediction functionality. The testing result is displayed through the assignment interface 400. In an example, the impact analysis 425 determines that the executing application 120 can utilize the data of the new data structure 415.

Figure 5:
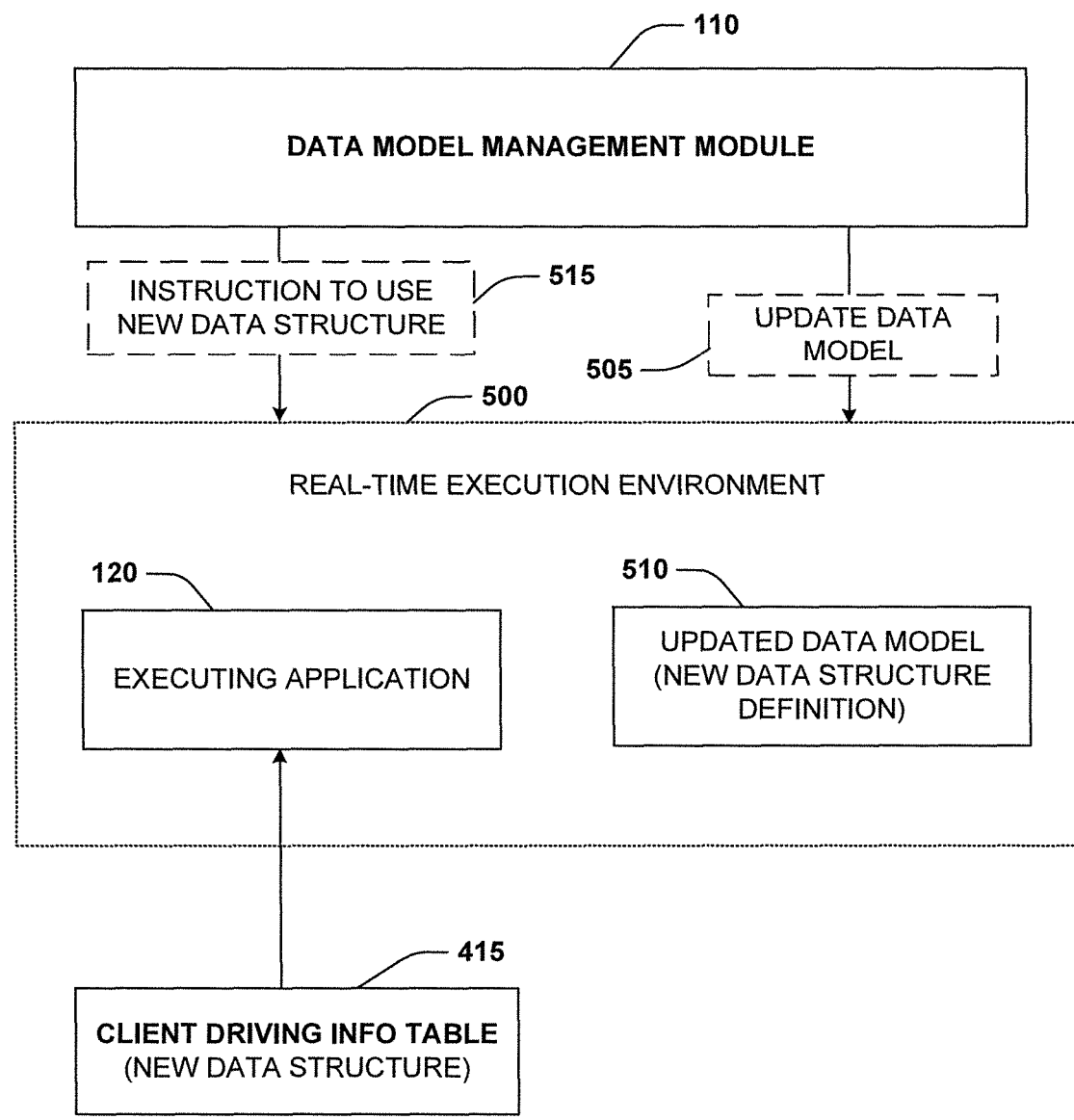
FIG. 5 illustrates an embodiment of a system associated with introducing a new data structure to an executing application, where a data model is updated and an executing application is instructed to use a new data structure.

At 220, the data model 140 is updated 505 to include the new data structure definition 305 to create an updated data model 510, as illustrated in FIG. 5. The new data structure definition 305 may be formatted into a format used by the data model 140 to create a formatted data structure definition. The formatted data structure definition may be included within the updated data model 510. The update 505 of the data model 140 may be performed while the executing application 120 is executing and/or while the data model 140 is available through a real-time execution environment 500 for access by executing applications. For example, the data model 140 may still be available for executing applications to use for identifying representations of data elements of data available for use by the executing applications. In this way, executing applications may utilize the updated data model 510 to determine how the attributes of the new data structure 415 are defined so that such executing applications can access and use data from the new data structure 415

At 225, the data model management module 110 generates control instructions 515 to instruct the executing application 120 to utilize data from the new data structure 415, such as the client driving info table, according to the updated data model 510. In an embodiment, an execution path of the executing application 120 is modified to utilize data from the client driving info table as input. The executing application 120 is reconfigured, such as on-the-fly during execution of the executing application 120, to process data from the client driving info table according to the updated data model 510. In an example, a risk analysis function of the executing application 120 may be dynamically reconfigured to utilize data from the client driving info table when generating risk analysis reports.

Figure 6:
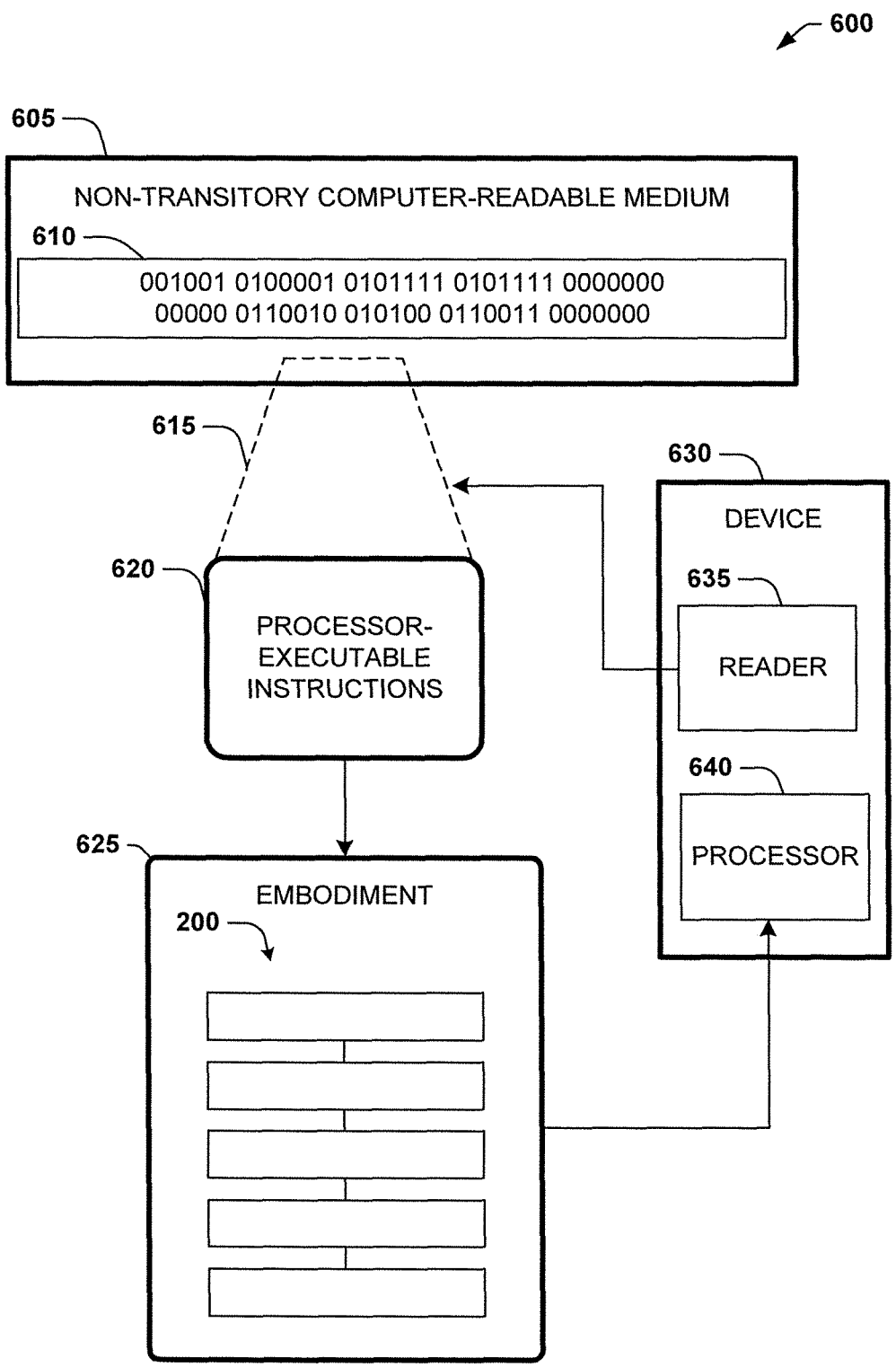
FIG. 6 illustrates an embodiment of a non-transitory computer-readable medium.

FIG. 6 is an illustration of a scenario 600 involving an example non-transitory computer-readable medium 605. In one embodiment, one or more of the components described herein are configured as program modules, such as the data model management module 110, stored in the non-transitory computer-readable medium 605. The program modules are configured with stored instructions, such as processor-executable instructions 620, that when executed by at least a processor, such as processor 640, cause the computing device to perform the corresponding function(s) as described herein. For example, functionality of the data model management module 110, stored in the non-transitory computer-readable medium 605, may be executed by the processor 640 as the processor-executable instructions 620 to perform an embodiment 625 of the method 200 of FIG. 2.

The non-transitory computer-readable medium 605 includes the processor-executable instructions 620 that when executed by a processor 640 cause performance of at least some of the provisions herein. The non-transitory computer-readable medium 605 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 605 stores computer-readable data 610 that, when subjected to reading 615 by a reader 635 of a device 630 (e.g., a read head of a hard disk drive, or a read operation invoked on a solid-state storage device), express the processor-executable instructions 620.

In some embodiments, the processor-executable instructions 620, when executed cause performance of operations, such as at least some of the example method 200 of FIG. 2, for example. In some embodiments, the processor-executable instructions 620 are configured to cause implementation of a system, such as at least some of the example system 100 of FIG. 1, for example.

Figure 7:
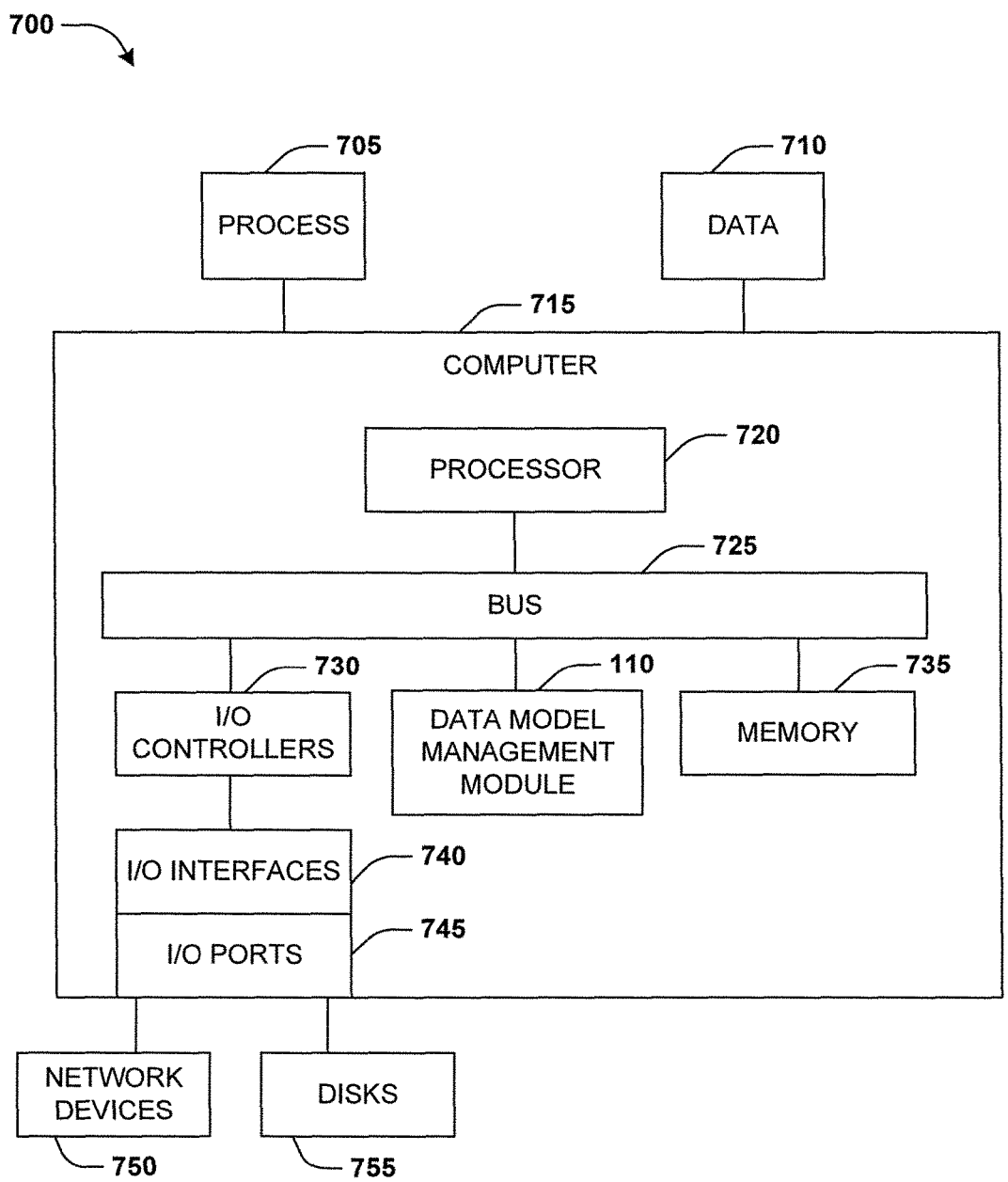
FIG. 7 illustrates an embodiment of a computing system configured with the example systems and/or methods disclosed.

FIG. 7 illustrates an example computing device that is configured and/or programmed with one or more of the example systems and methods described herein, and/or equivalents. The example computing device may be the computer 715 that includes a processor 720, a memory 735, and I/O ports 745 operably connected by a bus 725. In one example, the computer 715 may include logic of the data model management module 110 configured to facilitate the system 100 and/or the method 200 shown in FIGS. 1-2. In different examples, the logic of the data model management module 110 may be implemented in hardware, a non-transitory computer-readable medium 705 with stored instructions, firmware, and/or combinations thereof. While the logic of the data model management module 110 is illustrated as a hardware component attached to the bus 725, it is to be appreciated that in other embodiments, the logic of the data model management module 110 could be implemented in the processor 720, stored in memory 735, or stored in disk 755.

In one embodiment, logic of the data model management module 110 or the computer 715 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 715 as data 710 that are temporarily stored in memory 735 and then executed by processor 720.

The logic of the data model management module 110 may also provide means (e.g., hardware, non-transitory computer-readable medium 705 that stores executable instructions, firmware) for performing rule based source sequencing for allocation.

Generally describing an example configuration of the computer 715, the processor 720 may be a variety of various processors including dual microprocessor and other multiprocessor architectures. The memory 735 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 755 may be operably connected to the computer 715 via, for example, the I/O interface 740 (e.g., card, device) and the I/O ports 745. The disks 755 may be, for example, a magnetic disk drive, a solid state disk drive, a floppy disk drive, a tape drive, a Zip drive, a flash memory card, a memory stick, and so on. Furthermore, the disks 755 may be a CD-ROM drive, a CD-R drive, a CD-RW drive, a DVD ROM, and so on. The memory 735 can store a process, such as within the non-transitory computer-readable medium 705, and/or data 710, for example. The disk 755 and/or the memory 735 can store an operating system that controls and allocates resources of the computer 715.

The computer 715 may interact with input/output (I/O) devices via the I/O interfaces 740 and the I/O ports 745. The I/O devices may be, for example, a keyboard, a microphone, a pointing and selection device, cameras, video cards, displays, the disks 755, the network devices 750, and so on. The I/O ports 745 may include, for example, serial ports, parallel ports, and USB ports. I/O controllers 730 may connect the I/O interfaces 740 to the bus 725.

The computer 715 can operate in a network environment and thus may be connected to the network devices 750 via the I/O interfaces 740, and/or the I/O ports 745. Through the network devices 750, the computer 715 may interact with a network. Through the network, the computer 715 may be logically connected to remote computers (e.g., the computer 715 may reside within a distributed computing environment to which clients may connect). Networks with which the computer 715 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computer causes the processor to:
   execute an application as an executing application to process data of attributes stored within a data structure maintained according to a data model;
   receive a new data structure definition of a new data structure to define for the data model, wherein the new data structure definition defines at least one attribute for the new data structure not stored within the data structure;
   perform impact analysis to determine whether the executing application is capable of processing data of the new data structure; and
   in response to determining that the executing application is capable of processing the data of the new data structure:
      update the data model to include the new data structure definition to create an updated data model;
      generate control instructions to instruct the executing application to utilize data from the new data structure according to the updated data model, wherein the executing application is controlled to execute the control instructions; and
      during execution of the executing application, execute the control instructions to reconfigure the executing application to access data of attributes stored within the new data structure and bypass processing data from the data structure.

2. The non-transitory computer-readable medium of claim 1, wherein the computer-executable instructions cause the processor to:
   determine that the executing application is capable of processing data of the at least one attribute of the new data structure not stored within the data structure.

3. The non-transitory computer-readable medium of claim 1, wherein the computer-executable instructions to cause the processor to:
   reconfigure the executing application to operate with the new data structure without recompiling the executing application.

4. The non-transitory computer-readable medium of claim 1, wherein the computer-executable instructions for performing impact analysis comprise computer-executable instructions to cause the processor to:
   generate an impact analysis report specifying that the executing application can use data from the new data structure as a filter for filtering data processed by the executing application.

5. The non-transitory computer-readable medium of claim 1, wherein the computer-executable instructions for performing impact analysis comprise computer-executable instructions to cause the processor to:
   generate an impact analysis report specifying that the executing application can use data from the new data structure as a variable for an analysis function that is executed by the executing application.

6. The non-transitory computer-readable medium of claim 1, wherein the computer-executable instructions for performing impact analysis comprise computer-executable instructions to cause the processor to:
   generate an impact analysis report specifying that the executing application can use data from the new data structure to generate a report.

7. The non-transitory computer-readable medium of claim 1, wherein the new data structure definition is received through a new data structure definition interface, and wherein the computer-executable instructions cause the processor to:
   in response to determining that the executing application is not capable of processing the data of the new data structure, provide a notification through the new data structure definition interface that the new data structure cannot be utilized by the executing application.

8. A computing system, comprising:
   a processor connect to memory;
   a data model management module stored on a non-transitory computer readable medium and configured with instructions that when executed by the processor cause the processor to:
   execute an application as an executing application to process data of attributes stored within a data structure maintained according to a data model;
   receive a new data structure definition of a new data structure to define for the data model, wherein the new data structure definition defines at least one attribute for the new data structure not stored within the data structure;
   perform impact analysis to determine whether the executing application is capable of processing data of the new data structure; and
   in response to determining that the executing application is capable of processing the data of the new data structure:
      update the data model to include the new data structure definition to create an updated data model;
      generate control instructions to instruct the executing application to utilize data from the new data structure according to the updated data model, wherein the executing application is controlled to execute the control instructions; and
      during execution of the executing application, execute the control instructions to reconfigure the executing application to access data of attributes stored within the new data structure and bypass processing data from the data structure.

9. The computing system of claim 8, wherein the instructions cause the processor to:

display an assignment interface populated with a set of attributes of the new data structure and a set of functionality provided by the executing application;

receive an assignment of an attribute of the set of attributes to a function of the set of functionality through the assignment interface; and instruct the executing application to utilize data of the attribute as input to the function.

10. The computing system of claim 9, wherein the instructions cause the processor to:

perform a test of the assignment by inputting data of the attribute into the executing application to obtain a testing result showing how output of the executing application changes based upon consumption of the data of the attribute; and display the testing result through the assignment interface.

11. The computing system of claim 8, wherein the instructions for performing impact analysis comprise instructions to cause the processor to:

perform a test of the new data structure by inputting data from the new data structure to the executing application as an additional set of conditions to generate an impact analysis report derived using the additional set of conditions.

12. The computing system of claim 8, wherein the instructions for updating the data model comprise instructions to cause the processor to:

update the data model during execution of the executing application.

13. The computing system of claim 8, wherein the instructions for generating control instructions comprise instructions to cause the processor to:

dynamically instruct the executing application to utilize data from the new data structure without interrupting execution of the executing application.

14. The computing system of claim 8, wherein the instructions for updating the data model comprise instructions to cause the processor to:

update a schema of the data model based upon the new data structure.

15. The computing system of claim 8, wherein the instructions for updating the data model comprise instructions to cause the processor to:

update a logical application object of the data model, used by the executing application, based upon the new data structure.

16. A computer-implemented method, the computer-implemented method involving a computing device comprising a processor, and the computer-implemented method comprising:

reconfiguring, by the processor, an executing application to operate with a new data structure, wherein the executing application processes data stored within a data structure maintained according to a data model, wherein the processor is caused to reconfigure the executing application by:

receiving, by the processor, a request to apply the new data structure to the data model, wherein the new data structure is defined with at least one attribute not stored within the data structure;

performing, by the processor, impact analysis to determine whether the executing application is capable of processing data of the new data structure; and in response to determining that the executing application is capable of processing the data of the new data structure:

updating, by the processor, the data model to include the new data structure to create an updated data model;

generating, by the processor, control instructions to instruct the executing application to utilize data from the new data structure according to the updated data model wherein the executing application is controlled to execute the control instructions; and during execution of the executing application, execute the control instructions to reconfigure the executing application to access data of attributes stored within the new data structure and bypass processing data from the data structure.

17. The computer-implemented method of claim 16, wherein the data model and the executing application are hosted within a distributed cloud computing environment.

18. The computer-implemented method of claim 16, the updating the data model further comprising:

updating, by the processor, the data model on-the-fly during real-time operation of the data model.

19. The computer-implemented method of claim 16, the generating control instructions further comprising:

instructing, by the processor, the executing application on-the-fly during real-time execution of the executing application to utilize data from the new data structure as input.

20. The computer-implemented method of claim 16, further comprising: in response to determining that the executing application is not capable of processing the data of the new data structure, turning off, by the processor, an execution path of the executing application directed to the new data structure.

* * * * *